Aug. 5, 1958  A. B. ACIEGO  2,845,706
CUTTING TOOL
Filed April 12, 1956

*INVENTOR.*
ALFONSO B. ACIEGO
BY *Elliott & Pastoriza*
ATTORNEYS

United States Patent Office 2,845,706
Patented Aug. 5, 1958

2,845,706

CUTTING TOOL

Alfonso B. Aciego, Lawndale, Calif.

Application April 12, 1956, Serial No. 577,871

1 Claim. (Cl. 30—346)

This invention relates generally to cutting tools and more particularly to a novel cutting blade having multiple cutting portions adapted to be progressively exposed from a holding means.

In applicant's co-pending application, Serial No. 523,659, filed July 22, 1955, and entitled Adapter Head for Tool Handle, there is disclosed an adapter head for supporting an auxiliary cutting tool for co-operation with a conventional type linoleum cutting knife. In the combination tool of this co-pending application, the conventional knife portion is usually employed to cut a scribe line on linoleum and the auxiliary tool then used to actually cut through the linoleum. For this latter purpose the auxiliary tool is provided with a hooked type cutting portion.

After prolonged use of the hooked type auxiliary tool, the cutting edge generally becomes worn to the extent that replacement of the blade is necessary. In the aforementioned co-pending application, the auxiliary cutting blade is provided with a second cutting portion on its inner end whereby the blade may simply be reversed to expose a new cutting portion after the first cutting portion is no longer usable. After both ends of the cutting blade have been used, the blade is disposed of and a new blade is inserted. This practice necessitates the provision of spare blades and is time consuming in that readjustment is necessary each time a new blade is inserted. Furthermore, the substitution of an entirely new blade for a used one can be somewhat costly from a material standpoint.

Bearing the above factors in mind, it is a primary object of the present invention to provide an improved cutting tool in which maximum use is made of the material of the cutting blade whereby a saving in material costs is effected.

Another object is to provide a novel cutting tool which saves time and avoids the necessity of maintaining a large number of spare blades on hand.

Briefly, these and other objects and advantages of this invention are attained by providing a cutting tool in the form of a holding means for securing an elongated blade element having a plurality of uniformly spaced cutting portions along a longitudinal edge. The holding means is designed to secure the blade element in adjustable positions such that the cutting portions may be progressively exposed. The blade element itself is provided with scribe lines associated respectively with each of the cutting portions whereby the cutting portions may be progressively broken off after they are too dull to be of any further use.

While the principles of the invention are clearly applicable to many different types of cutting tools, the preferred embodiment of the present invention will be described in connection with a simple linoleum cutter. For this purpose reference will now be had to the accompanying drawings in which.

Figure 1:
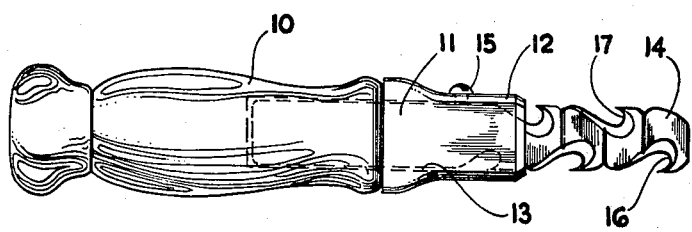
Figure 1 is a side elevational view of a linoleum cutter incorporating the novel cutting tool of this invention.
Figure 2:
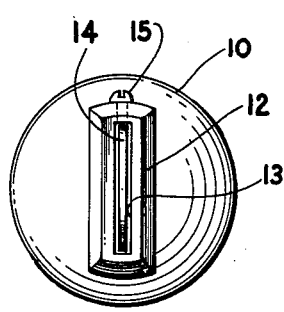
Figure 2 is a front view of the tool.

Referring to both Figures 1 and 2 there is shown a linoleum knife comprising a hollow handle 10 provided with a threaded boss 11 on one end. A holding means in the form of an elongated member 12 is threadedly secured to the boss 11 and includes a longitudinal slot 13 for receiving and holding the cutting blade 14. As will be evident from Figure 1, the slot 13 extends completely through the member 12 and a securing means is provided in the form of a set screw 15 adapted to bear against the blade 14 in order to hold it securely within the member 12.

Figure 3:
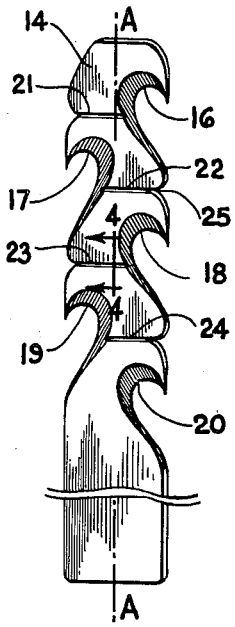
Figure 3 is an enlarged perspective view of the cutting blade element of this invention; and, Figure 4 is a cross section of a portion of the blade of Figure 3 taken in the direction of the arrows 4—4.

Referring specifically to Figure 3, it will be noted that the blade 14 consists of an elongated element having substantially parallel longitudinal edges indented inwardly towards the longitudinal central axis A—A of the element at spaced longitudinal points. By this arrangement alternate cutting portions 16, 17, 18, 19 and 20 are provided on each of the longitudinal edges respectively. It will also be noted that the cutting portions 16, 18 and 20 are axially displaced from the cutting portions 17 and 19 on the opposite edge of the elongated element 14.

Figure 4:
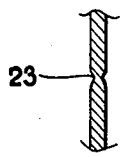

The blade element 14 also includes a series of transverse scribe lines 21, 22, 23, and 24 associated with each of the cutting portions. As shown best in Figure 4, the scribe lines, such as the scribe line 23 are provided on both surfaces of the blade element 14 so that a relatively thinned portion is provided whereby the blade element is weakened in its resistance to flexing forces applied normally to the surfaces of the element at the scribe line. However, the blade is still sufficiently strong to resist tension or axial forces. In Figure 3, each of the scribe lines initiates at a central portion of the cutting portions and passes transversely to a point on an opposite longitudinal edge between adjacent cutting portions. Thus, each scribe line traverses the element 14 at a point where its width is a minimum. Further, at the location where the scribe line terminates between two adjacent cutting portions, such as at 25 between the cutting portions 16 and 18, the longitudinal edge is recessed to decrease further the width across which the scribe line extends. The corners of these recessed portions are also rounded to provide smooth surfaces. The arrangement is such that the cutting portions may be progressively broken or snapped off thereby leaving a relatively rounded and smooth head as a part of the next adjacent cutting portion.

The operation of the cutting tool of this invention will be clear from the above description. With the elongated cutting blade element 14 inserted in the holding means such as the member 12 of Figure 1, the first exposed cutting portion is used in a routine manner. When the cutting portion 16 becomes sufficiently worn that it is no longer useful, it may simply be snapped off from the principal part of the tool along the scribe line 21. The set screw 15 may then be loosened and the elongated blade element 14 moved longitudinally out of the slot 13 a sufficient distance for use of the next cutting portion 17. The set screw 15 may then be tightened, the tool rotated 180°; and the cutting portion 17 used until it becomes dull and no longer usable. At this time the blade 14 may again be longitudinally extended from the holding means to expose the next cutting portion 18 and the old cutting portion 17 snapped off along the scribe line 25.

In an actual cutting operation, the forces established in the cutting tool are directed along the axis of the blade and therefore transverse to the scribe line. The scribe lines will not seriously weaken the blade in the direction of these forces, but only to forces directed normal to the surface.

If desired, the cutting element 14 may be provided with a plurality of cutting portions along one longitudinal edge only. In the event the blade is employed as an auxiliary tool such as in the aforementioned copending application, such a construction would avoid the necessity of removing the blade in order to reverse it. In the preferred embodiment shown in the drawings, however, the provision of cutting portions on both longitudinal edges serves to make maximum use of the material of the cutting element 20.

It will be noted that because of the smoothly rounded construction at the terminal points of the scribe lines between adjacent cutting portions such as at 25 the breaking off of the used cutting portion leaves a smoothly rounded head for the next successive cutting portion so that no sharp corners remain which might possibly mar or damage the work.

Further, not only is maximum use made of the cutting blade material but the necessity of carrying about several spare blades is avoided by this invention.

While the invention has been described in connection with a linoleum cutting knife, the principles of the multiple cutting portions and scribe lines on a single elongated blade element are applicable to many different types of cutting tools. Such modifications to adapt the blade to different uses will occur to those skilled in the art and are deemed to be encompassed within the scope and spirit of the present invention. The cutting tool is, therefore, not to be thought of as limited to the specific embodiment shown and described.

What is claimed is:

A cutting tool comprising: an elongated element having a central longitudinal axis and longitudinal edges indented inwardly towards said longitudinal axis to define hook shaped cutting portions uniformly spaced along each of said longitudinal edges, the cutting portions along one longitudinal edge being displaced in a direction parallel to said central longitudinal axis relative to the cutting portions along the other longitudinal edge so that a transverse line perpendicular to said central longitudinal axis and passing through the indentation of any one of said cutting portions on one edge, falls between the two adjacent indentations defining two adjacent cutting portions on the opposite edge, said element including scribe lines extending respectively from substantially the midpoint of each cutting portion on one longitudinal edge, across said longitudinal axis at right angles thereto, to a midposition between two adjacent cutting portions on the other longitudinal edge to decrease the resistance of said element to flexing forces directed normally to the plane of said element at said scribe lines, whereby cutting portions of said element may be progressively snapped off.

References Cited in the file of this patent

UNITED STATES PATENTS

| | | |
|---|---|---|
| 1,206,585 | Parrahm | Nov. 28, 1916 |
| 2,051,199 | Christianson | Aug. 18, 1936 |
| 2,126,080 | Backer | Aug. 9, 1938 |
| 2,787,058 | Vogel | Apr. 2, 1957 |

FOREIGN PATENTS

| | | |
|---|---|---|
| 10,207 | Great Britain | July 31, 1928 |